(12) United States Patent
Clarke et al.

(10) Patent No.: US 8,078,957 B2
(45) Date of Patent: Dec. 13, 2011

(54) DOCUMENT SYNCHRONIZATION OVER STATELESS PROTOCOLS

(75) Inventors: Simon P. Clarke, Seattle, WA (US); Miko Arnab Sakhya Singha Bose, Seattle, WA (US); Peter P. Baer, Seattle, WA (US); Hani Saliba, Seattle, WA (US); Xuelei Sun, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 12/113,975

(22) Filed: May 2, 2008

(65) Prior Publication Data

US 2009/0276698 A1  Nov. 5, 2009

(51) Int. Cl.
 *G06F 17/00* (2006.01)
(52) U.S. Cl. ........... 715/229; 715/273
(58) Field of Classification Search ........ 715/212, 715/243, 244, 246, 247, 255, 229, 253, 273
See application file for complete search history.

(56) References Cited

U.S. PATENT DOCUMENTS

| | | | | |
|---|---|---|---|---|
| 5,774,868 | A * | 6/1998 | Cragun et al. | 705/10 |
| 5,924,092 | A * | 7/1999 | Johnson | 1/1 |
| 6,925,467 | B2 | 8/2005 | Gu et al. | 707/101 |
| 7,096,311 | B2 | 8/2006 | Chiang | 711/100 |
| 7,138,998 | B2 | 11/2006 | Forest et al. | 345/419 |
| 7,313,575 | B2 * | 12/2007 | Carr et al. | 1/1 |
| 7,322,012 | B2 * | 1/2008 | Ishii | 715/811 |
| 7,325,202 | B2 * | 1/2008 | Shirriff | 715/742 |
| 7,702,563 | B2 * | 4/2010 | Balson et al. | 705/37 |
| 7,750,908 | B2 * | 7/2010 | Kincaid et al. | 345/440 |
| 2002/0029227 | A1 * | 3/2002 | Multer et al. | 707/203 |
| 2002/0129052 | A1 * | 9/2002 | Glazer et al. | 707/501.1 |
| 2002/0184139 | A1 * | 12/2002 | Chickering et al. | 705/38 |
| 2004/0054711 | A1 | 3/2004 | Multer | 709/201 |
| 2005/0010576 | A1 | 1/2005 | Ren et al. | 707/100 |
| 2005/0015436 | A1 | 1/2005 | Singh et al. | 709/203 |
| 2006/0010143 | A1 | 1/2006 | Netz et al. | 707/100 |
| 2006/0075004 | A1 | 4/2006 | Stakutis et al. | 707/204 |
| 2006/0112113 | A1 | 5/2006 | Gu et al. | 707/100 |
| 2007/0106679 | A1 * | 5/2007 | Perrin et al. | 707/100 |
| 2008/0163056 | A1 * | 7/2008 | Lamadon | 715/716 |
| 2008/0195601 | A1 * | 8/2008 | Ntoulas et al. | 707/5 |
| 2009/0144654 | A1 * | 6/2009 | Brouwer et al. | 715/802 |
| 2009/0276459 | A1 * | 11/2009 | Trout et al. | 707/104.1 |
| 2010/0211571 | A1 * | 8/2010 | Prahlad et al. | 707/741 |

OTHER PUBLICATIONS

Brad Combs eMVP, http://xpefiles.com/cs/blogs/bcombs/archive/2007/08/21/howto-using-the-image-difference-engine-to-deploy-xpe-updates.aspx, 3 pgs. Aug. 21, 2007.

(Continued)

*Primary Examiner* — Laurie Ries
(74) *Attorney, Agent, or Firm* — Merchant & Gould P.C.

(57) ABSTRACT

Example systems, methods, and data structures are directed at synchronizing documents. One example data structure includes receiving a request from a first client to edit a document, and sending short-term check out metadata to the first client to begin an editing session. The data structure includes a plurality of cells and a plurality of data objects defining content of the document. Each data object is associated with one of the cells and has an object identifier that uniquely identifies the data object within the associated cell, and is configured to communicate with other cells and with objects within the associated cell. In addition, each of the cells is defined so that each other cell remains unaffected by changes to data objects of the cell.

12 Claims, 6 Drawing Sheets

OTHER PUBLICATIONS

ECMerge Pro (Windows) 2.1 by Ellié Computing, http://www.bestvistadownloads.com/software/k-folder-directory-compare-merge-diff-synchronize-synchronization-t-free-ecmerge-pro-windows—download-trbfmthl.html, 4 pgs. Retrieval date Nov. 2, 2007.

M. Satyanarayanan, "Coda: A Highly Available File System for a Distributed Workstation Environment," http://www.ks.uni-freiburg.de/download/studienarbeit/SS05/08-05-PVerg1NWDS-OHaller/Material/Coda/wwos2.pdf, 5 pgs. Retrieval date Nov. 2, 2007.

Randal C. Burns et al., "Experimentally Evaluating In-Place Delta Reconstruction," http://www.soe.ucsc.edu/~darrell/Papers/MSST-Burns-02.pdf, pp. 137-151 Retrieval date Nov. 2, 2007.

Randal C. Burns et al., "In-Place Reconstruction of Delta Compressed Files," http://www.almaden.ibm.com/projects/data/storagesystems/podc98.pdf, 9 pgs. Retrieval date Nov. 2, 2007.

Torsten Suel et al., "Algorithms for Delta Compression and Remote File Synchronization," http://cis.poly.edu/suel/papers/delta.pdf, pp. 1-24. Retrieval date Nov. 2, 2007.

International Search Report for US2009/039796 dated Apr. 7, 2009, 11 pages.

\* cited by examiner

FIG. 4    400

DOCUMENT SYNCHRONIZATION OVER STATELESS PROTOCOLS

BACKGROUND

In typical document systems, documents are accessed at the whole document level, such that an entire document is received by a client computer from a server for editing. This requires low level data associated with the underlying document format to be transmitted from the server to the client computer. Also, incremental document formats have to be garbage collected and defragmented over a network connection. Furthermore, locks must be controlled across the network. Controlling locks can be complex and fragile task that requires a significant amount of content to be exchanged. Transmitting low level data, including garbage collection and defragmentation information, as well as control locks, unnecessarily ties an application to it's low level file format and can be inflexible and lead to inefficiencies.

SUMMARY

Example systems and methods described herein relate to file (e.g. document) synchronization and/or loading over a stateless protocol.

According to one aspect, a data structure for storing a document on a first computing device independent of a document format of the document, the data structure includes: a plurality of cells and a plurality of data objects defining content of the document. Each of the cells has a cell identifier that uniquely identifies a particular cell within the document and is associated with at least one revision. Each data object is associated with one of the cells and has an object identifier that uniquely identifies the data object within the associated cell, and is configured to communicate with other cells and with objects within the associated cell. In addition, each of the cells is defined so that each other cell remains unaffected by changes to data objects of the cell.

According to another aspect, a revision manifest of a revision is stored on a computer readable medium of a first computing device. The revision manifest defines a revision representing a state of a cell at a point in time. The revision manifest includes: a plurality of object groups, each object group comprising at least one data object; and a unit of consistency comprising the at least one data object, each unit of consistency being defined so that editing one of the units of consistency does not affect any other unit of consistency.

According to yet another aspect, a method of synchronizing a document on a first computing device, the document broken into cells, each cell being defined by at lease one revision manifest, the method includes: receiving a first revision and at least one cell associated with the document; receiving an update to the first computing device, the update indicating an updated revision identifier associated with each cell associated with the document; retaining the first revision of each cell when the first revision identifier of the cell matches the updated revision identifier of the cell; generating a new revision of each cell, wherein generating the new revision comprises assigning the new revision a new revision identifier when the first revision identifier of the cell does not match the updated revision identifier of the cell; deleting any cell not referenced by the root objects; and synchronizing the document by replacing the cells with the new revision of each cell. The cell identifier includes a globally unique identifier (GUID) and an integer (INT) pair, the GUID being globally unique a scope defining a set of cells and revisions and including root objects, wherein cells within the scope are accessible via the root objects. The cell identifier is associated with a first revision having at least one first revision identifier. Each of the at least one revision identifiers representing a state of the cells at a point it time. The cell includes a scope defining a set of cells and revisions and the scope includes at least one root object. Cells within the scope are accessible via the root object.

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
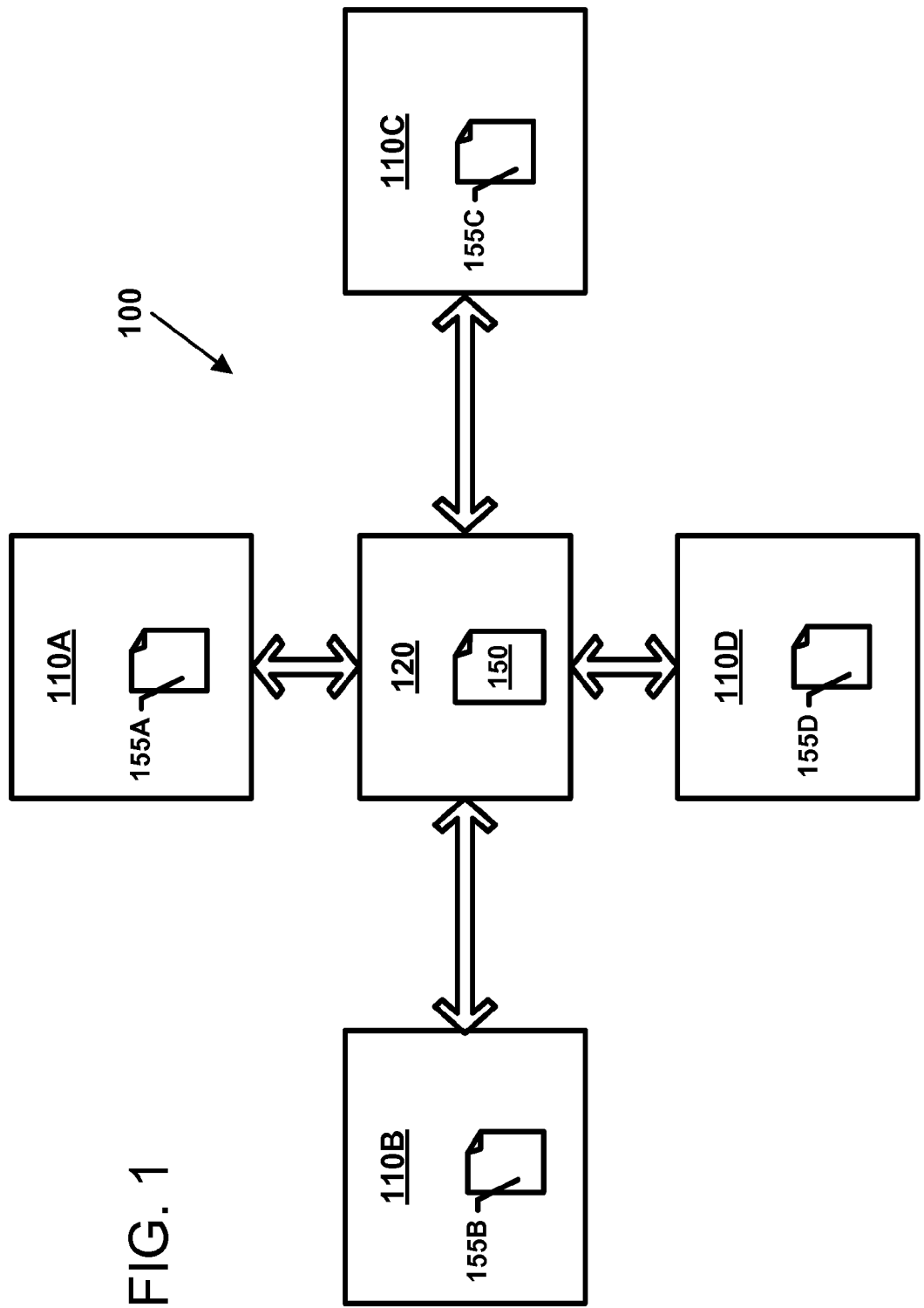
FIG. 1 is a schematic block diagram illustrating an example authoring system.

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the disclosure is defined by the appended claims and their equivalents.

Embodiments of the present disclosure provide an environment in which a single client can author a document or multiple clients can collaboratively author a document while consuming minimal server and transmission resources. In example embodiments, when a coauthoring capable application is editing a document, the application obtains only pieces of the document. Before the client receives the document pieces, an application's data model has been partitioned into explicit units of consistency.

In example embodiments described herein, a document is broken into a series of parts, referred to as units of consistency. By default, a document can be partitioned into a single unit of consistency that encompasses the entire document. When specific knowledge of the document's structure is know, the document can be partitioned into more than one unit of consistency. For instance, in a presentation, such as one created using the POWERPOINT® presentation graphics program, consisting of more than one slide can be partitioned into multiple units of consistency where each unit of consistency includes one slide. For example a presentation consisting of ten slides can be partitioned into ten units of consistency.

In the example above, more or less than ten units of consistency are possible. For instance, each slide may include a footer and each footer can be a unit of consistency. Therefore, the presentation consisting of ten slides may have 20 units of consistency. Also, by default the entire document may be one unit of consistency.

There are two main approaches to implementing deltas. First, deltas can be computed explicitly by a "diff" algorithm. For example, algorithm used may be the "Remote Differential Compression" (RDC) library found in the WINDOWS platform. The algorithmic approach has the advantage that the data can be considered opaque, and no structure or structural knowledge may be required. This is ideal for scenarios where the document's format is fixed, unknown or cannot be changed. Non-limiting examples of file formats that are fixed, unknown, or cannot be changed include text files, bitmap images and audio files.

The trade-off for this flexibility, however, is high computation cost and transmission inefficiencies caused by changes that cannot be tracked well by the algorithm. This may occur when the data has not been designed for efficient synchronization. That is, the data has no "explicit" deltas or good change locality.

Second, deltas can be sub-divided into smaller units of change call "granules" that can align relatively closely with the expected changes. The delta is then a set of granules that can be different between two states. This scheme is less computationally expensive and has the potential to be more efficient when the data can effectively be sub-divided into small units of change that close align with expected updates.

The two approaches can be used independently or in combination. For example, when both approaches are used in combination, a document access model can provide an arbitrary level of granularity within units of consistency. Through an explicit delta scheme, synchronization engines can leverage the arbitrary level of granularity to improve efficiency.

Turning now to the figures, FIG. 1 illustrates an example authoring system 100 having features that illustrate examples aspects of the disclosure. The authoring system 100 includes a storage device 120 storing a master copy of a document 150. In one embodiment, the storage device 120 may include, but not limited to, a server, a client computer, or other computing device. In another embodiment, the storage device 120 can include one or more storage devices (e.g., a network of computing devices).

The authoring system 100 also includes one or more client computing devices 110A, 110B, 110C, 110D that is communicatively coupled to the storage device 120. Each of the client computing devices can edit the document 150 by receiving an update to one or more units of consistency 155 and editing data objects within the unit of consistency 155. The units of consistency 155 are synchronized when the client computing devices periodically send to the storage device 120 updates to be shared with the other client computing devices.

As the term is used herein, a client computing device includes any computing device that obtains a unit of consistency to be authored from a master copy of the document. The client computing device can be different from the storage device 120 or can include a different client account implemented on the storage device 120. In one embodiment, a computing device that acts as a storage device 120 for one document may act as a client computing device for a different document and vice versa.

In the example shown, four client computing devices 110A, 110B, 110C, and 110D are communicatively coupled to the storage device 120. In other embodiments, however, any number of computing devices may be coupled to the storage device 120. In the example shown, each client computing device 110A, 110B, 110C, 110D can send to the storage device 120 updates generated by the client of the client computing device and can request from the storage device 120 other units of consistency for editing/authoring. In one embodiment, the storage device 120 can be a server computing device and the client computing devices 110A, 110B, 110C, 110D can be client computing devices. Other system configurations are possible. For example, in an alternative embodiment, multiple server computing devices can be used.

Figure 2:
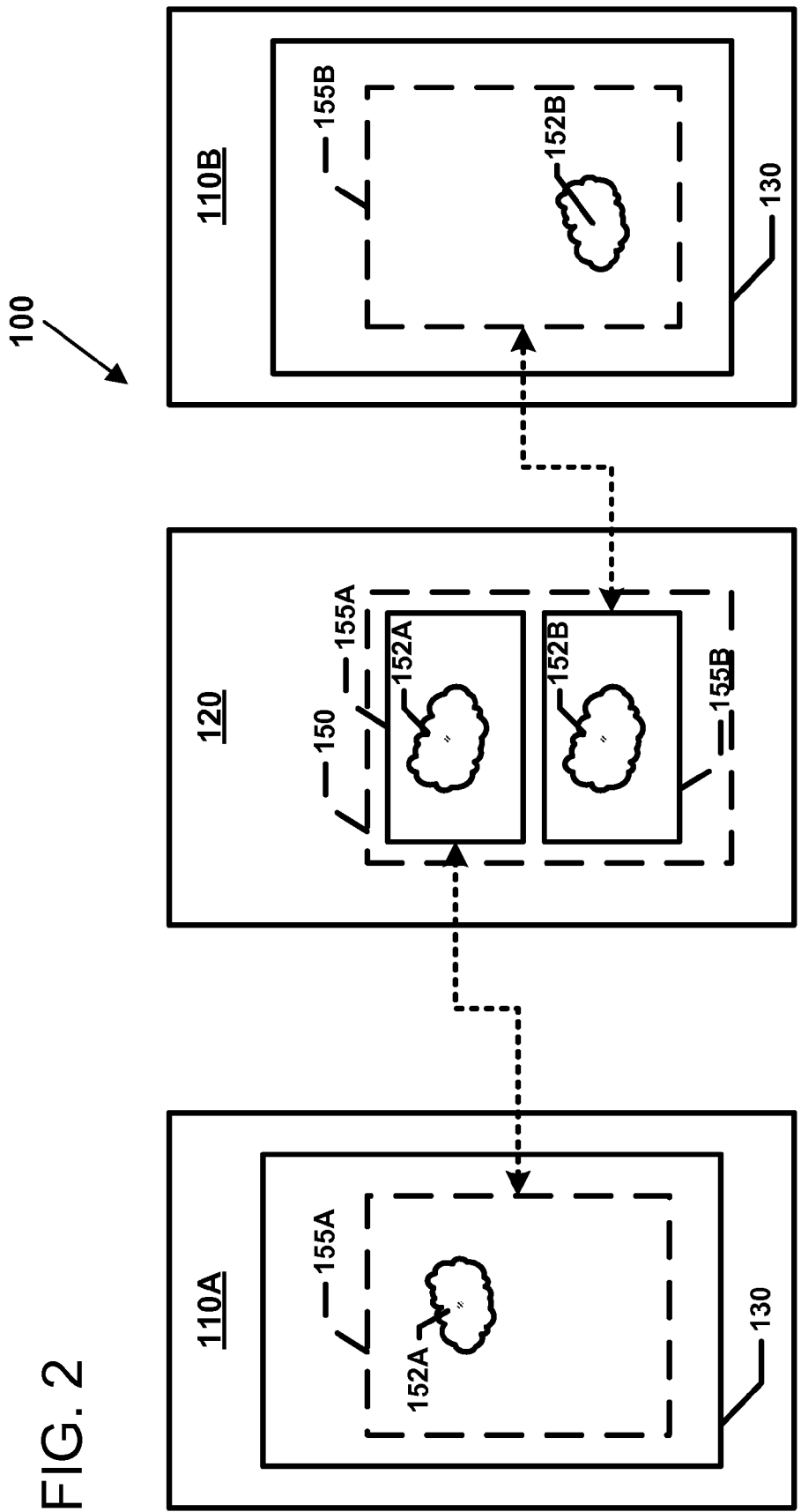
FIG. 2 is a schematic block diagram illustrating the authoring system of FIG. 1 in which a document stored on first computing device can include content units of consistency.

As shown in FIG. 2, the document 150 stored on the storage device 120 can include content 152A and 152B partitioned into units of consistency 155A, 155B. Authoring applications 130 on the client computing devices 110 process and manipulate the content of the units of consistency 155A, 155B of the document 150. In general, the client computing device 110A can synchronize updates to the content 152A separately from updates provided by the client computing device 110B. Because updates are being made to different units of consistency, there will not be a merge conflict between the units of consistency.

Figure 3:
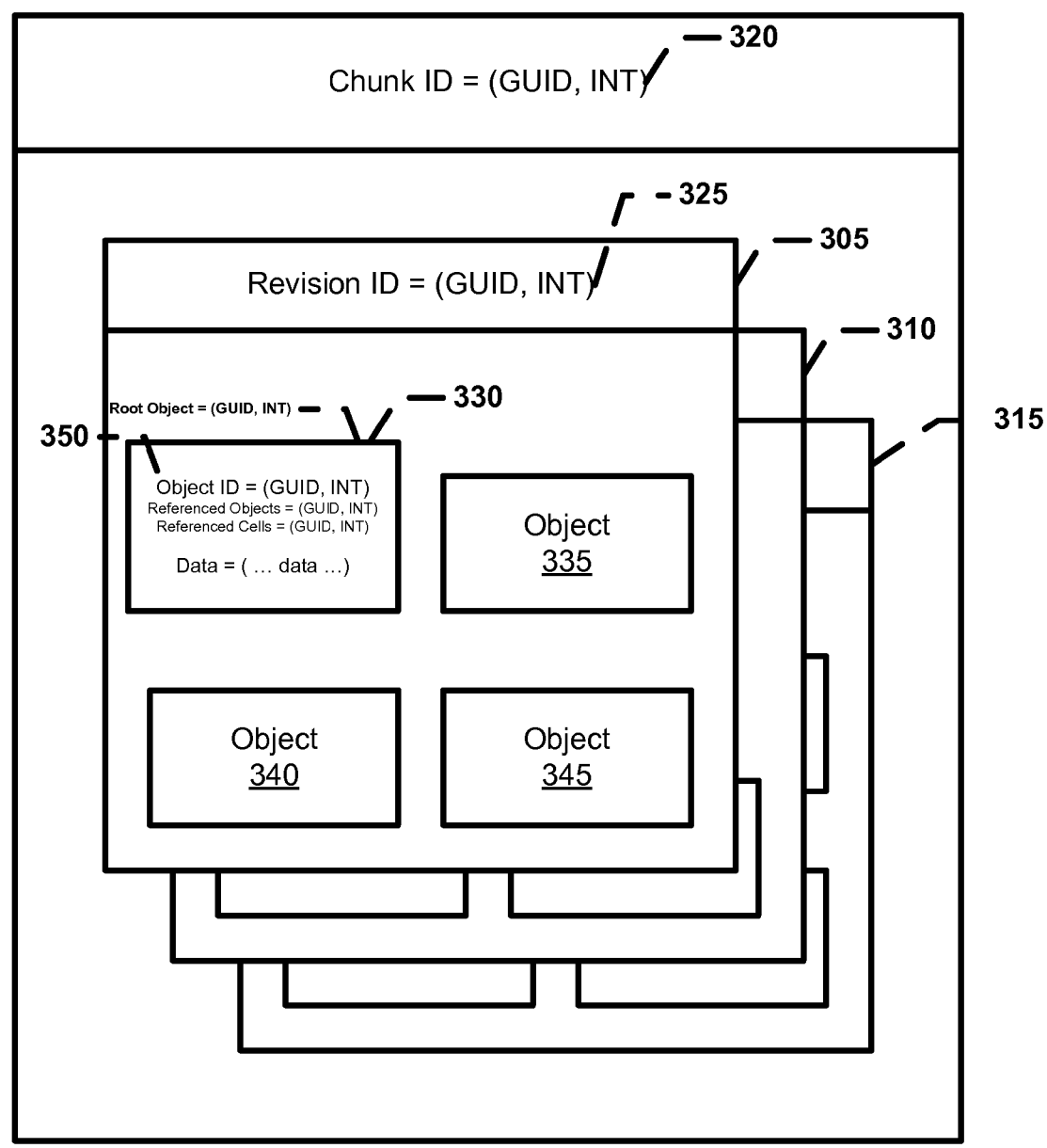
FIG. 3 is a schematic block diagram of unit of consistency.

Referring to FIG. 3, a unit of consistency 155A (i.e., a data structure) is shown including a plurality of revisions for the unit of consistency 155A 305, 310, and 315. Cells are groups of data objects with similar properties. For example, a cell may contain a grouping of text, a grouping of pictures, etc. Each of the cells 305, 310, and 315 includes a cell identifier 320 (only shown for cell 305) that uniquely identifies a particular cell within the document 150. Each of the cells 305, 310, and 315 can communicate with at least one other cell within the document 150 using cell identifiers. Also, each of cells 305, 310, and 315 are associated with at least one revision 325 (only shown for cell 305). Note that a cell's state is described by a revision that contains the state of a group of data objects.

Each cell can include a cell identifier including a global unique identifier (GUID) and integer (INT) pair. Each cell can also be included within a file defining a set of cells and revisions. The scope can also include at least one root object. Cells within the scope can be accessible via the root objects. The cell identifier can be associated with a first revision including at least one first revision identifier. Each of the at least one revision identifiers can represent a state of the cells at a point it time. Not that the term file is being used to represent a named storage "entity" and does not have to be a physical file such as a text file or jpeg image.

The unit of consistency 155A includes a plurality of data objects 330, 335, 340, and 345 defining content of the document 150. In general, data objects can be arbitrary binary data. Non-exclusive examples of data objects include text, a picture, a table, a hyperlink, a movie file, an audio file, etc. Each data object 330, 335, 340, and 345 is associated with one of the cells 305, 310, and 315 and has an object identifier that uniquely identifies the data object within the associated cell. For example, an object identifier 350 uniquely identifies the data object 330 within the cell 305. The cell identifiers, object identifiers, and revision identifiers can include a GUID and INT pair. Furthermore, the GUID can be globally unique within a cell.

Each data object 330, 335, 340, and 345 is configured to communicate with other cells and with objects within the associated cell. For instance, the data object 330 can communicate reference cells 310 and 315 and not the objects contained within cells 310 and 315. This helps ensure consistency even if one cell is changed independently from another. In general, an object can reference any other object within the same cell and other cells, but not the objects in the other cells. In addition, each of the cells 305, 310, and 315 is defined so that each other cell remains unaffected by changes to data objects of the cell. Also, each cell 305, 310, and 315 may be able to reference at least one cell within a scope. A scope can define a set of cells and revisions. See FIG. 4 for a schematic of a scope.

During partitioning, each of the data objects 330, 335, 340, and 345 can be grouped into at least one object group. The use of object groups minimizes the overhead of tracking objects individually. In a scenario where all objects are relatively large, object groups would be unnecessary since the overhead is small. However, in a scenario where objects can be arbitrarily small, object groups are used to control overhead. Object groups also allow for taking objects (i.e. units of change) and grouping them together into larger units. During portioning there is a need to try and maintain the "unit of change" characteristic even as groups are created.

The storage device 120 can sort the data objects 330, 335, 340, and 345 into object groups based on various factors, such as a probability (i.e. a usage based heuristic) that each data object will be updated by client computer 110. For example, objects can be grouped into a number of categories. Non-limiting examples of categories include: 1) object types that are known to change frequently (e.g. document metadata properties, such as word count and last modified time); ii) object types that are known to change very frequently (e.g. pictures) iii) objects that the frequency of change is unknown; and iv) objects that have been changing frequently (e.g. the list structure for the list the user has been frantically modifying).

In addition, the storage device 120 can sort the data objects 330, 335, 340, and 345 into the object groups based on a size of each data object. For example, size can be a input to a sorting algorithm. If an object is considered large then the overhead of tracking the object is as single object becomes insignificant. This is especially true when the benefit is considered (i.e. this helps prevent fetching or synchronizing the object unnecessarily). If an object is very small with respect to the overhead of an object group, then the object may be grouped, irrespective of how often the object changes.

Figure 4:
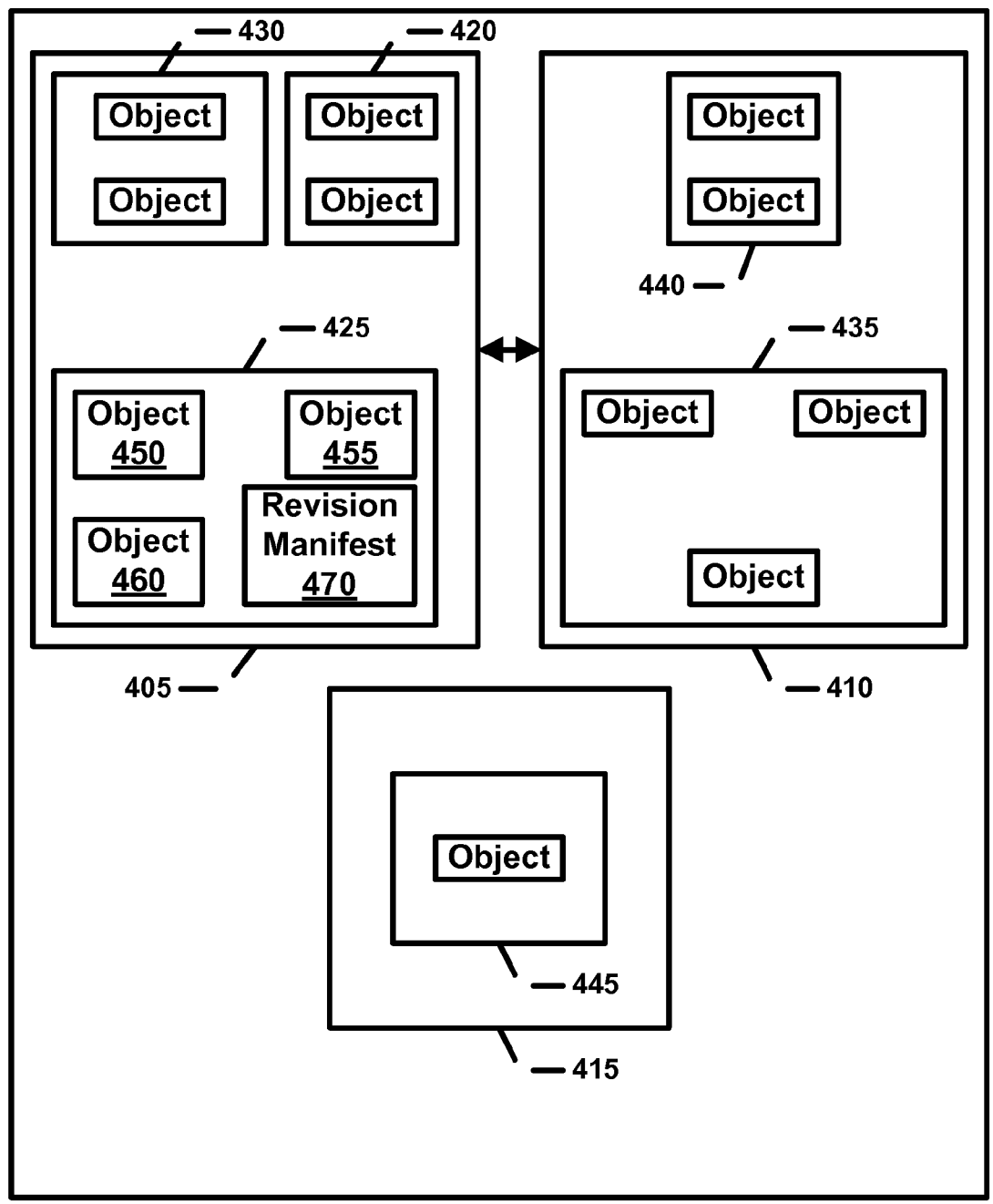
FIG. 4 is a schematic block diagram of a scope.

As stated above, each cell 305, 310, and 315 may be able to reference at least one cell within a scope and a scope can define a set of cells and revisions. FIG. 4 shows a schematic block diagram of a scope 400. The scope 400 includes a root cell 405, a cell 410, and a garbage cell 415. For instance, the root cell 405 includes revisions 420, 425, and 430. An example of a revision may include the last auto-saved instance of the unit of consistency 155A, a state of the file before the last change. For instance, a revision may include the state of a text field before text was added (revision one). If text is added to the text field, a new revision can be created (revision two). Therefore, an "undo" operation would revert from revision two to revision one. Also, each cell may include differing number of revisions. For example, the cell 405 includes two revisions (revisions 435 and 440) and the garbage cell includes one revision (revision 445).

The cell revisions are achieved by partitioning a document into units of consistency that allow a unit of replication (or update) to be significantly smaller than the entire document. Using cell revisions allows changes to be seen quicker. In the case of a partial synchronization (i.e. synchronizing units of consistency vs. the entire document), partitioning allows the updates to be seen that would not otherwise be seen. Effective partitioning also allows merging applications to run less. For instance, conflicts, by definition, can only occur when changes occur in the same unit of consistency, and any other changes in different units of consistency cannot create conflicts and a synchronization application can run without requiring a merge. In addition, units of consistency can form an effective basis for incremental load/save operations. When fully integrated with an application, load and synchronization scenarios are more responsive and new sharing/collaboration features can be created.

In order to maintain consistency within units of consistency all updates need to be guaranteed consistent. This entails potentially inconsistent updates be batched together to form a consistent update, a transaction. A sub-file access application programming interface (API) can perform updates, through transactions, with no uncontrolled range level byte access.

For effective synchronization and replication sub-file versioning may be used and performed at the unit of consistency level (i.e. the partitions). In its simplest form this can involve nothing more than assigning a GUID to each partition that changes whenever an update to that partition is made.

Updates can be made at the unit of consistency level trough new versions in the form of transitions. Synchronizations can involve transferring new version (i.e. states) between a client and a server. Updates, however, are usually small and based on some previous state that both the client and server may already possess. This can be leveraged by transferring the differences, or deltas, to make the synchronization more efficient.

Each revision can include any number of data objects. For instance, revision 425 has three data objects (data objects 450, 455, and 460). For each revision of a cell a revision manifest 470 can be created. The revision manifest 470 can indicate the root set for objects contained in the revision, any dependency/references to other revision manifests, and object groups (i.e. how the objects are arranged into object groups). Each revision manifest 470 can point to other object groups defined in a previous revision manifest.

The revision manifest 470 can define a revision representing a state of the document 150 at a point in time. The revision manifest 470 includes at least one object group and each object group includes at least one data object. The revision manifest 470 also describes a single revision, which by definition can only be used to describe the state of objects within a single cell (which is a unit of consistency).

A second computing device (e.g. storage device 120) can partially or fully determine which data objects are arranged into which object group. The second computing device can also define each object group based on how frequently each object is updated. In addition, the second computing device can define each object group based on a size of the object. Also, first computing device (e.g. client computer 110) can influence which data objects are arranged into which object groups.

Figure 5:
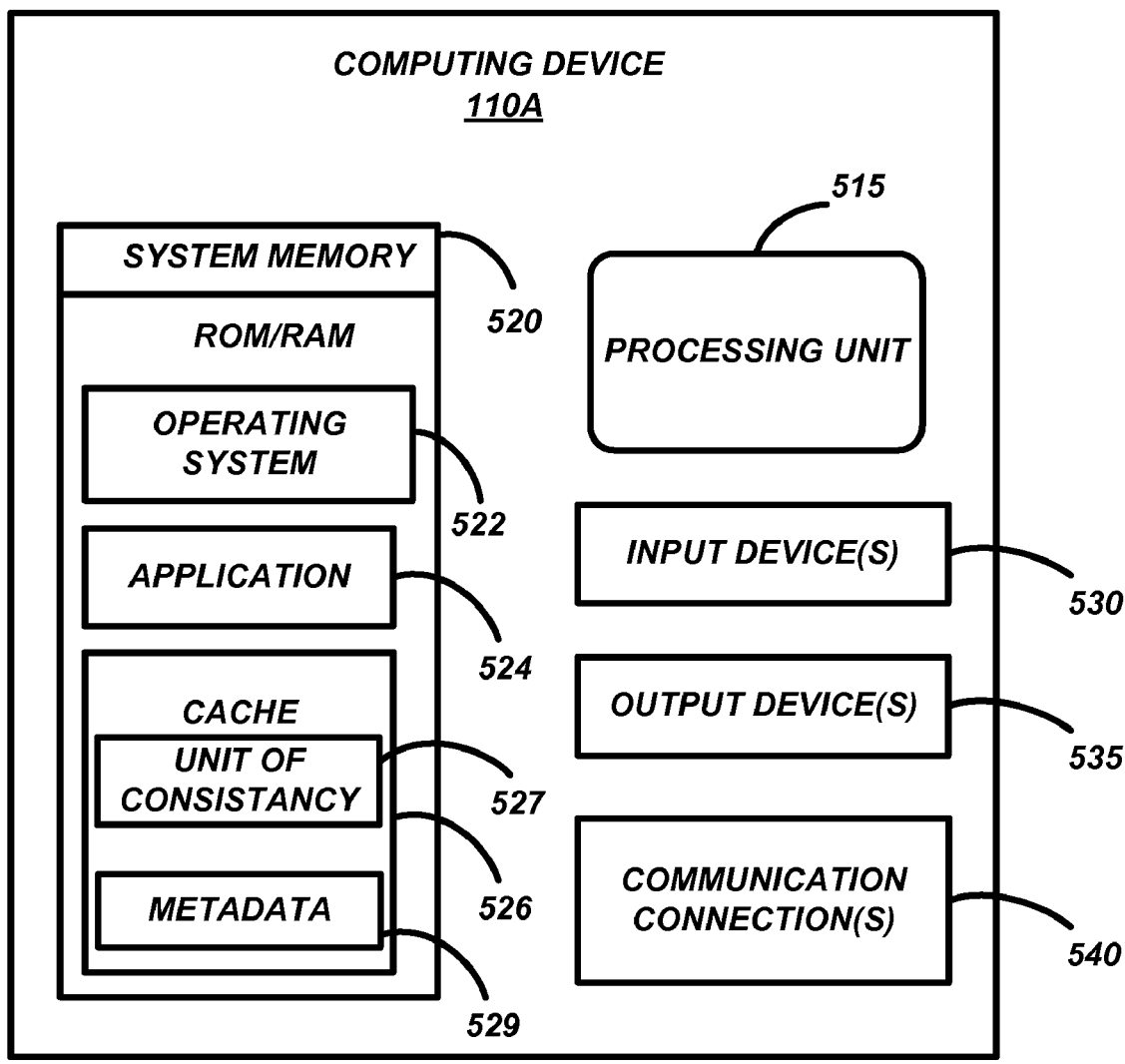
FIG. 5 is a schematic block diagram of an example client computing system configured to implement an authoring environment.

Referring now to FIG. 5, the client device 110A is shown in more detail. The client device 110A can be a personal computer, a server computer, a notebook computer, a PDA, a Smartphone, or any other such computing device.

In FIG. 5, the example client computing device 110A typically includes at least one processing unit 515 for executing applications and programs stored in system memory 520.

Depending on the exact configuration and type of computing device 110A, the system memory 520 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 520 typically stores an operating system 522, such as the WINDOWS® operating systems from Microsoft Corporation of Redmond, Wash., suitable for controlling the operation of the computing device 110A. System memory 520 also may include a document cache 526 in which a unit of consistency 527 of a document can be stored. Metadata 529 of the document also can be stored within the client cache 526.

The system memory 520 also may store one or more software applications, such as the authoring applications 130 that are used for creating and editing documents. One non-limiting example of the authoring applications 130 suitable for authoring documents in accordance with the principles of the present disclosure is WORD® word processing software from Microsoft Corporation. Other non-limiting examples of authoring applications include POWERPOINT® presentation software, VISIO® drawing and diagramming software, and INTERNET EXPLORER® internet browser, all from Microsoft Corporation. Other software applications can also be used.

Computing device 110A also may have input device(s) 530, such as a keyboard, mouse, pen, voice input device, touch input device, etc., for entering and manipulating data. Output device(s) 535, such as a display screen, speakers, printer, etc., also may be included. These output devices 535 are well known in the art and need not be discussed at length herein.

The computing device 110A also may contain communication connections 540 that allow the device 110A to communicate with other computing devices, for example, the storage device 120 of FIG. 1, over a network in a distributed computing environment (e.g., an intranet or the Internet). By way of example, and not limitation, communication device media 540 includes wired media such as a wired network or direct-wired connection, and wireless media, such as acoustic, RF, infrared and other wireless media.

Figure 6:
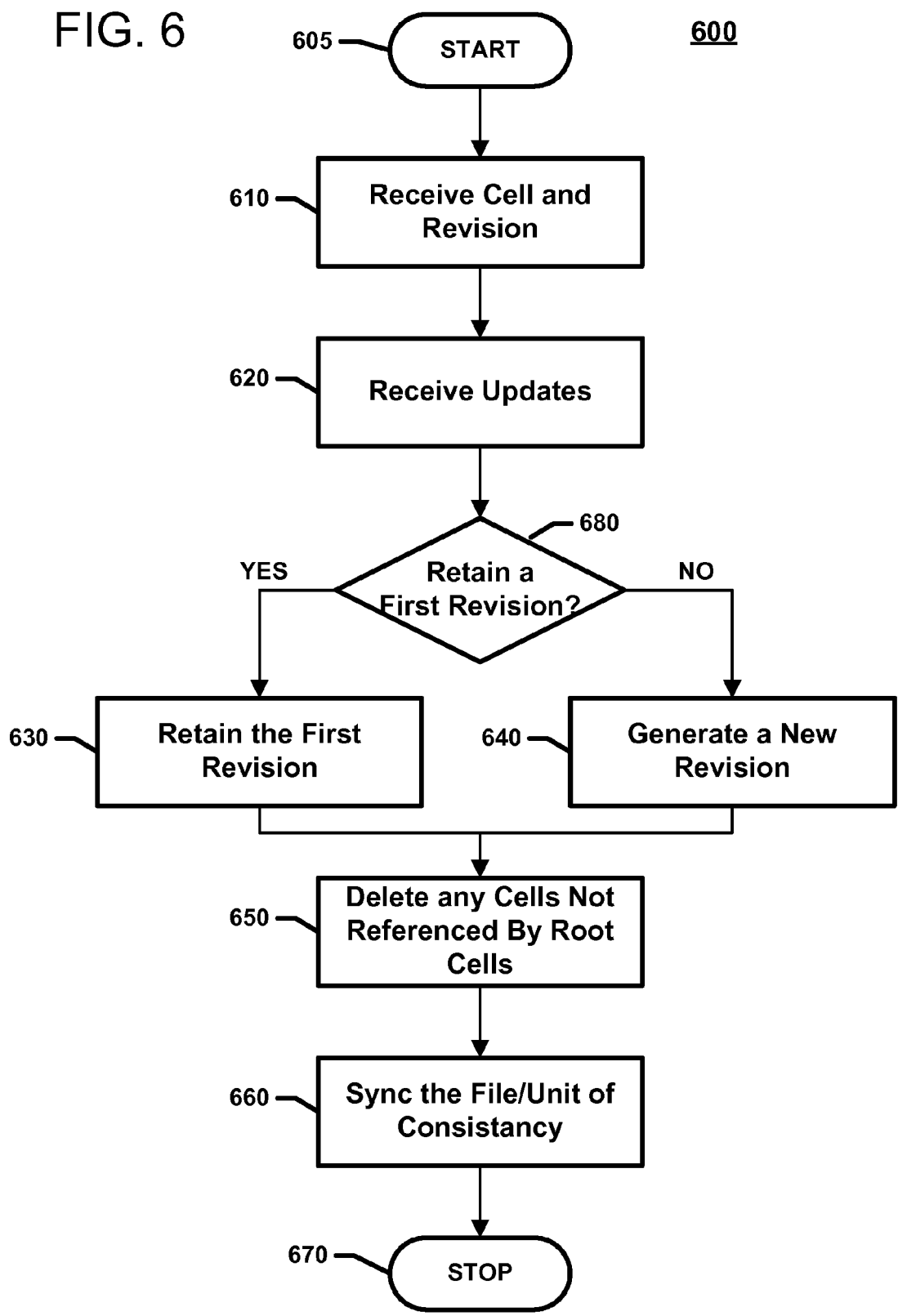
FIG. 6 is a flowchart illustrating an example synchronizing process implemented by an authoring application.

FIG. 6 is a flow chart setting forth the general stages involved in a method 600 consistent with an embodiment of the disclosure for synchronizing a document after changes have been made to a unit of consistency. Method 600 may be implemented using a computing device 110A as described in above with respect to FIG. 5. Ways to implement the stages of method 600 will be described in greater detail below.

Method 600 begins at starting block 605 and proceeds to stage 610 where computing device 110A may receive a revision and any cells to which the revision applies. For example, a set of revisions can be received with corresponding instructions as to which cells should have their state set to which revision. In other words, when synchronizing the following is received: i) {Revision}—Set of revisions; ii) {(cell, revision)}—Set of cell id's, revision id tuples which describe the cells that are "modified" and what their new state is in terms of the received revisions. "Modified" means that some piece of information within the revision is changed. For instance a client using computing device 110A (e.g. a client computer) may receive a slide from a presentation or the header/footer information from a word processing document. Once the changes have been applied, the store may dispense with any cells and/or revisions that cannot be "discovered" by starting at the root cells and traversing the object/cell references.

"Discovering" refers to an optimization that stores can make to get rid of extraneous data that is no longer used by clients because the clients have no way of accessing the data. For example, once changes have been applied, the store may dispense with any cells and/or revisions that are no longer referenced directly or indirectly, from the root cells.

From stage 610, where computing device 110A receive a revision and any cells to which the revision applies, method 600 may advance to stage 620 where computing device 110A may receive updates to the unit of consistency 527. The updates can indicate an updated revision identifier associated with each cell associated with unit of consistency 527 or the document 150. For example, computing device 110A may be running the POWERPOINT® presentation graphics program, and the unit of consistency 527 may be a slide. Updates to the slide may be received as a user edits the slide.

Once computing device 110A receives updates to the unit of consistency 527 in stage 620, method 600 may continue to stage 680 where computing device 110A decides if the first revision is to be retained or a new revision is to be generated. When computing device 110A determines the first revision is to be retained, method 600 continues to stage 630 where computing device 110A may retain the first revision. The first revision may be retained when the first revision identifier of the cell matches the updated revision identifier of the cell. An example of when the first revision identifier may match the updated revision identifier is when a revision is made and then the revision is undone. For instance, the user may type a word on the slide and then delete the newly typed word. Since the slide has not changed there is no need to generate a new revision.

When computing device 110A determines a new revision is to be created, method 600 continues to stage from stage 680, to stage 640 where computing device 110A generates a new revision. Generating the new revision can include assigning the new revision a new revision identifier when the first revision identifier of the cell does not match the updated revision identifier of the cell. Generating the new revision can also include determining for each cell whether an object identifier of each object within the cell matches an updated object identifier. The updated object identifier can define a revision manifest. The revision manifest can define a revision of the unit of consistency 527 or the document and may include at least a first object group that contains at least a first data object. The revision manifest may also point to a previous revision manifest. For example, during a user edit, an application tracks the set of objects that are modified as part of the user edit. A new revision ID is then created using a standard GUID generation algorithm. The set of objects are then packaged into object groups (as discussed above) and then the object groups and the previous revision's manifest are referenced from a new revision manifest that represents the new revision.

Once computing device 110A generates a new revision in stage 640, method 600 may continue to stage 650 where computing device 110A may garbage collect any cell not referenced by the root objects. Garbage collecting includes determining objects that cannot be "discoverer" by traversing the object/cell references starting at root cells. Since the garbage collected cells cannot be accessed, they will never be needed and disk space/resourced can freed up by deleting them.

Once computing device 110A delete any cell not referenced by the root objects in stage 650, method 600 may continue to stage 660 where computing device 110A may synchronize the document 150 or the unit of consistency 527.

For example, computing device 110A may synchronize the document by replacing the existing cells with the new revision of each cell. Once computing device 110A has synced the document 150 or the unit of consistency 527 in stage 660, method 600 may then end at stage 670.

Reference may be made throughout this specification to "one embodiment," "an embodiment," "embodiments," "an aspect," or "aspects" meaning that a particular described feature, structure, or characteristic may be included in at least one embodiment of the present disclosure. Thus, usage of such phrases may refer to more than just one embodiment or aspect. In addition, the described features, structures, or characteristics may be combined in any suitable manner in one or more embodiments or aspects. Furthermore, reference to a single item may mean a single item or a plurality of items, just as reference to a plurality of items may mean a single item. Moreover, use of the term "and" when incorporated into a list is intended to imply that all the elements of the list, a single item of the list, or any combination of items in the list has been contemplated.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

What is claimed is:

1. A method of synchronizing a document on a first computing device, the document being broken into cells, and each cell being defined by at lease one revision manifest, the method comprising:

receiving a first revision and at least one cell associated with the document, the at least one cell, comprising a cell identifier comprising a global unique identifier and an integer pair, the global unique identifier being globally unique, the cell identifier being associated with the first revision comprising at least one first revision identifier, each of the at least one revision identifiers representing a state of the cells at a point it time, and a scope defining a set of cells and revisions and the scope including at least one root object, wherein cells within the scope are accessible via the at least one root object;

receiving an update to the first computing device, the update indicating an updated revision identifier associated with each cell associated with the document;

retaining the first revision of each cell when the first revision identifier of the cell matches the updated revision identifier of the cell;

generating a new revision of each cell, wherein generating the new revision comprises assigning the new revision a new revision identifier when the first revision identifier of the cell does not match the updated revision identifier of the cell;

deleting any cell not referenced by the root objects; and synchronizing the document by replacing the cells with the new revision of each cell.

2. The method of claim 1, wherein generating the new revision comprises determining for each cell whether an object identifier of each object within the cell matches an updated object identifier.

3. The method of claim 2, wherein the updated object identifier defines a revision manifest defining a revision of the document and including at least a first object group that contains at least a first data object.

4. The method of claim 3, wherein the revision manifest points to an object group defined in a previous revision manifest.

5. One or more computer storage media not consisting of a propagated data signal and comprising computer-executable instructions that, when executed perform a method for synchronizing a document on a first computing device, the document being broken into cells, and each cell being defined by at lease one revision manifest, the method comprising:

receiving a first revision and at least one cell associated with the document, the at least one cell comprising a cell identifier comprising a global unique identifier and an integer pair, the global unique identifier being globally unique, the cell identifier being associated with the first revision comprising at least one first revision identifier, each of the at least one revision identifiers representing a state of the cells at a point it time, and a scope defining a set of cells and revisions and the scope including at least one root object, wherein cells within the scope are accessible via the at least one root object;

receiving an update to the first computing device, the update indicating an updated revision identifier associated with each cell associated with the document;

retaining the first revision of each cell when the first revision identifier of the cell matches the updated revision identifier of the cell;

generating a new revision of each cell, wherein generating the new revision comprises assigning the new revision a new revision identifier when the first revision identifier of the cell does not match the updated revision identifier of the cell;

deleting any cell not referenced by the root objects; and synchronizing the document by replacing the cells with the new revision of each cell.

6. The computer storage media of claim 5, wherein generating the new revision comprises determining for each cell whether an object identifier of each object within the cell matches an updated object identifier.

7. The computer storage media of claim 5, wherein the updated object identifier defines a revision manifest defining a revision of the document and including at least a first object group that contains at least a first data object.

8. The computer storage media of claim 5, wherein the revision manifest points to an object group defined in a previous revision manifest.

9. A computer system for updating multiple presence publications using a single update publication batch request, the computer system comprising:

at least one processor; and at least one memory, communicatively coupled to the at least one processor and containing computer-readable instructions that, when executed by the at least one processor, provide a method for synchronizing a document on a first computing device, the document being broken into cells, and each cell being defined by at lease one revision manifest, the method comprising:

receiving a first revision and at least one cell associated with the document, the at least one cell comprising a cell identifier comprising a global unique identifier and an integer pair, the global unique identifier being globally unique, the cell identifier being associated with the first revision comprising at least one first revision identifier, each of the at least one revision identifiers representing a state of the cells at a point it time, and a scope defining a set of cells and revisions and the scope including at least one root object, wherein cells within the scope are accessible via the at least one root object;

receiving an update to the first computing device, the update indicating an updated revision identifier associated with each cell associated with the document;

retaining the first revision of each cell when the first revision identifier of the cell matches the updated revision identifier of the cell;

generating a new revision of each cell, wherein generating the new revision comprises assigning the new revision a new revision identifier when the first revision identifier of the cell does not match the updated revision identifier of the cell;

deleting any cell not referenced by the root objects; and synchronizing the document by replacing the cells with the new revision of each cell.

10. The computer system of claim 9, wherein generating the new revision comprises determining for each cell whether an object identifier of each object within the cell matches an updated object identifier.

11. The computer system of claim 9, wherein the updated object identifier defines a revision manifest defining a revision of the document and including at least a first object group that contains at least a first data object.

12. The computer system of claim 9, wherein the revision manifest points to an object group defined in a previous revision manifest.

\* \* \* \* \*